United States Patent
Cha et al.

(10) Patent No.: US 9,454,560 B2
(45) Date of Patent: Sep. 27, 2016

(54) CACHE-CONSCIOUS CONCURRENCY CONTROL SCHEME FOR DATABASE SYSTEMS

(75) Inventors: Sang K. Cha, Seoul (KR); Sangyong Hwang, Seoul (KR); Kihong Kim, Seoul (KR); Keunjoo Kwon, Seoul (KR)

(73) Assignee: SAP SE, Walldorf (DE)

( * ) Notice: Subject to any disclaimer, the term of this patent is extended or adjusted under 35 U.S.C. 154(b) by 1794 days.

(21) Appl. No.: 11/934,986

(22) Filed: Nov. 5, 2007

(65) Prior Publication Data

US 2008/0065670 A1 Mar. 13, 2008

Related U.S. Application Data

(63) Continuation of application No. 10/162,731, filed on Jun. 4, 2002, now Pat. No. 7,293,028.

(60) Provisional application No. 60/296,870, filed on Jun. 8, 2001.

(51) Int. Cl.
*G06F 17/30* (2006.01)

(52) U.S. Cl.
CPC .............................. *G06F 17/30356* (2013.01)

(58) Field of Classification Search
None
See application file for complete search history.

(56) References Cited

U.S. PATENT DOCUMENTS

| | | | |
|---|---|---|---|
| 5,276,872 A * | 1/1994 | Lomet et al. | |
| 5,410,697 A * | 4/1995 | Baird et al. | 711/152 |
| 5,475,837 A * | 12/1995 | Ishak et al. | |
| 5,758,356 A * | 5/1998 | Hara et al. | |
| 5,956,707 A * | 9/1999 | Chu | |
| 6,009,425 A | 12/1999 | Mohan | |
| 6,122,645 A * | 9/2000 | Bohannon et al. | |
| 6,247,025 B1 * | 6/2001 | Bacon | |
| 6,272,465 B1 | 8/2001 | Hewitt et al. | |
| 6,272,503 B1 * | 8/2001 | Bridge et al. | |
| 6,317,819 B1 | 11/2001 | Morton | |
| 6,411,957 B1 * | 6/2002 | Dijkstra | |
| 6,470,344 B1 * | 10/2002 | Kothuri et al. | |
| 6,606,626 B1 * | 8/2003 | Ponnekanti | |
| 6,772,153 B1 * | 8/2004 | Bacon et al. | |
| 7,093,109 B1 * | 8/2006 | Davis et al. | 712/228 |
| 7,293,028 B2 | 11/2007 | Cha et al. | |

OTHER PUBLICATIONS

Lehman et al, "Efficient Locking for Concurrent Operations on B-Trees," Dec. 1981, ACM Transactions on Database Systems (TODS), vol. 6, Issue 4, pp. 650-670.*

* cited by examiner

*Primary Examiner* — Charles Adams
(74) *Attorney, Agent, or Firm* — Schwegman Lundberg & Woessner, P.A.

(57) ABSTRACT

An optimistic, latch-free index traversal ("OLFIT") concurrency control scheme is disclosed for an index structure for managing a database system. In each node of an index tree, the OLFIT scheme maintains a latch, a version number, and a link to the next node at the same level of the index tree. Index traversal involves consistent node read operations starting from the root. To ensure the consistency of node read operations without latching, every node update operation first obtains a latch and increments the version number after update of the node contents. Every node read operation begins with reading the version number into a register and ends with verifying if the current version number is consistent with the register-stored version number. If they are the same, the read operation is consistent. Otherwise, the node read is retried until the verification succeeds. The concurrency control scheme of the present invention is applicable to many index structures such as the B+-tree and the CSB+-tree.

33 Claims, 13 Drawing Sheets

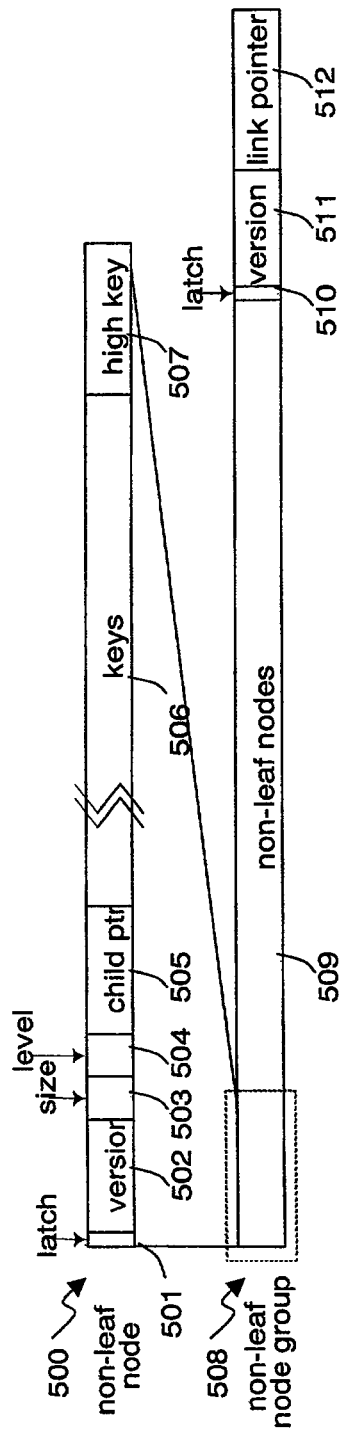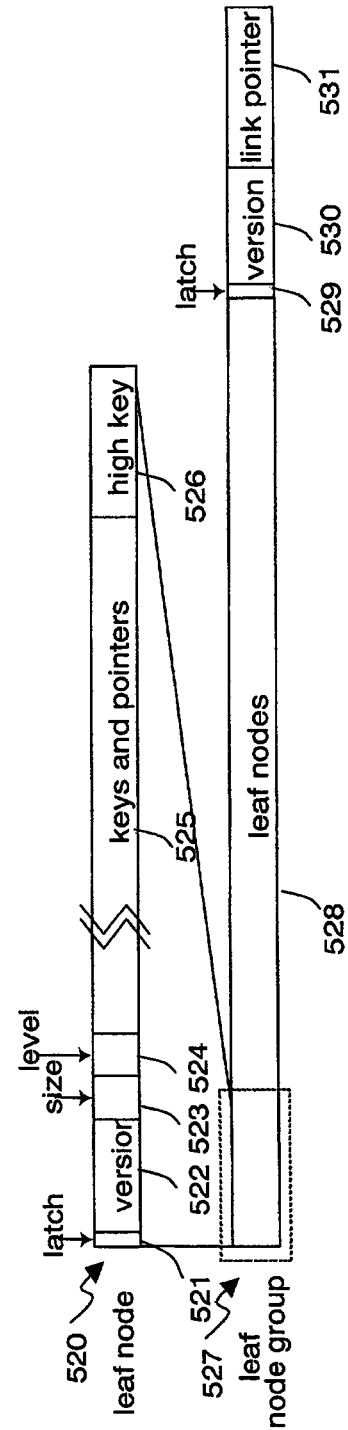
FIG. 8A
FIG. 8B

CACHE-CONSCIOUS CONCURRENCY CONTROL SCHEME FOR DATABASE SYSTEMS

RELATED APPLICATION

This continuation application claims the benefit of U.S. application Ser. No. 10/162,731 entitled "Cache-Conscious Concurrency Control Scheme for Index Structures in Main-Memory Database Systems," filed Jun. 4, 2002 now U.S. Pat. No. 7,293,028, and Provisional Application Ser. No. 60/296,870, filed Jun. 8, 2001, entitled "Cache-Conscious Concurrency Control Scheme for Index Structures in Main-Memory Database Systems." The entire content of each of the above applications is incorporated herein by reference.

BACKGROUND

1. Technical Field

This invention in general relates to database management systems. More specifically, this invention relates to a cache-conscious concurrency control scheme for memory-resident index structures in database systems.

2. Description of the Related Art

As the price of server DRAM modules continues to drop, the main memory database management system (MM DBMS) emerges as an economically viable alternative to the disk-resident database management system (DR DBMS) in many applications. MM DBMS is potentially capable of orders-of-magnitude higher performance than DR DBMS not only for read transactions but also for update transactions.

However, such a significant performance gain of MM DBMS over DR DBMS does not come automatically, but requires MM DBMS-specific optimization techniques, especially the efficient use of cache. Cache, a special memory device whose access time is much faster than main memory, stores frequently referenced data items so as to improve the overall memory access performance. The effect of cache in MM DBMS is an important consideration in the design of main memory indexes and query processing.

There are so-called cache-conscious index structures, such as CSS-tree (Cache-Sensitive Search Tree) and CSB+-tree (Cache-Sensitive B+Tree), that were proposed as alternative index structures that can reduce cache misses and thereby improve the search performance. The CSS-tree places the index nodes, level by level in an array, enabling the index traversal by computing the array offsets. The CSB+-tree keeps only one child pointer of B+-tree per node, almost doubling the fanout of the tree but at the expense of increasing the update cost.

There are other index structures such as the CR-tree, which efficiently compresses the MBR keys to pack more entries per node recognizing the pointer elimination is not effective for the R-tree whose MBR key is much bigger than a pointer. There are the pkT-tree and the pkB-tree that significantly reduce cache misses by storing partial-key information in the index in the face of nontrivial key sizes.

While all of these cache-conscious index structures employ some means of effectively increasing the index fanout and reducing the so-called cold and capacity cache misses, the design of the index structure did not take into account of concurrency control. Concurrency control is required to coordinate simultaneous execution of transactions in a multiprocessing environment having multiple users or multiple processors. Concurrency control is crucial to running real-world main memory database applications involving index updates as well as taking advantage of off-the-shelf multiprocessor platforms for scaling up the performance of such applications.

One approach to deal with this problem is to use a concurrency control scheme used in a conventional, disk-resident system, such as lock coupling. Lock coupling latches index nodes during index traversal. The index traversal proceeds from one node to its child by holding a latch on the parent while requesting a latch on the child. The requested latch is a shared mode if the child is not the target node. If the child is the target node, the requested latch may be a shared or exclusive mode, depending on the action to be performed on the target node. A shared lock is issued when a transaction wants to read data from a node. An exclusive lock is issued when a transaction wants to write a data item on a node. The latch on the parent node is released once the child node is latched. However, latching involves a memory write, which is subject to coherence cache misses in a multiprocessing environment.

There is a technique called physical versioning that allows index traversal without latching. The idea is to create a new version of an index node for the update so that the transactions reading existing index nodes would not interfere with those transactions updating index nodes. This enables latch-free traversal of indexes, achieving a high-level of concurrency for read transactions. Incorporation of the updated version into the index involves obtaining latches either at the tree-level or both on the tree and the node to update. The major problem with the physical versioning technique is a high cost of creating the versions. The index performance degrades sharply with increasing the update ratio. The scalability of update performance is very poor with respect to the number of multiple processing elements.

Therefore, there is a need for an efficient index structure and a concurrency control scheme that optimize database management systems against the high cost of cache invalidation in a multiprocessing environment.

BRIEF DESCRIPTION OF THE DRAWINGS

FIGS. 8A and 8B are illustrations of a structure of nodes for CSB+-Tree for OLFIT.

DETAILED DESCRIPTION

I. Concurrency Control

Coherence Cache Miss

Figure 1:
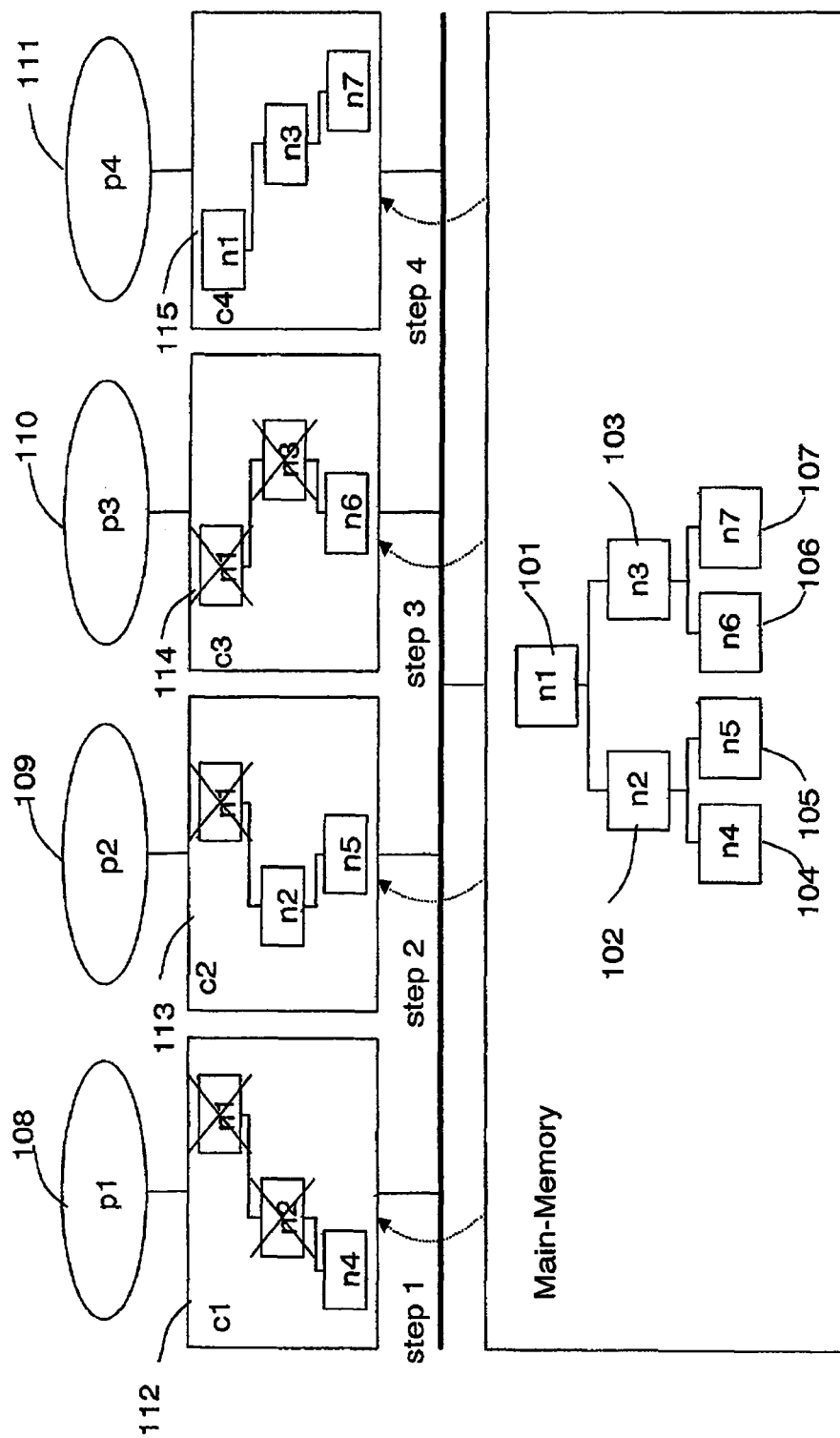
FIG. 1 is an illustration of cache invalidation in a multiprocessing environment involving multiprocessors.

FIG. 1 illustrates how coherence cache misses occur in a query processing system having a conventional database management system (DBMS). A DBMS is a collection of programs for managing the database structure and controlling access to the database. There is an index tree consisting of nodes, n1 through n7 (101 through 107), in main memory 100 for accessing a database in disk or in main memory. It is assumed for simplicity that that each node corresponds to a cache block and contains a latch. As noted above, a latch guarantees unique access to a data item by a transaction. There are 4 processors 108 through 111 accessing the main memory 100 through caches 112-115.

Let's consider a situation where processor p1 108 traverses the path (n1 101, n2 102, n4 104) upon cold start of the main memory query processing system, so that these nodes are replicated in cache c1 112 of p1 108. Latches are held and released on n1 and n2 on the way. Now, p2 109 traverses the path (n1 101, n2 102, n5 105), then these nodes are copied into c2 113, and n1 and n2 cached in c1 112 are invalidated by p2 109 latching on these nodes. Note that cache invalidation occurs even if there is enough room in cache c1 112. If p3 110 traverses the path (n1 101, n3 103, n6 106), n1 in c2 113 becomes invalidated. Finally, if p4 111 traverses the path (n1 101, n3 103, n7 107), n1 and n3 in c3 114 become invalidated.

OLFIT Scheme of the Present Invention

Figure 2:
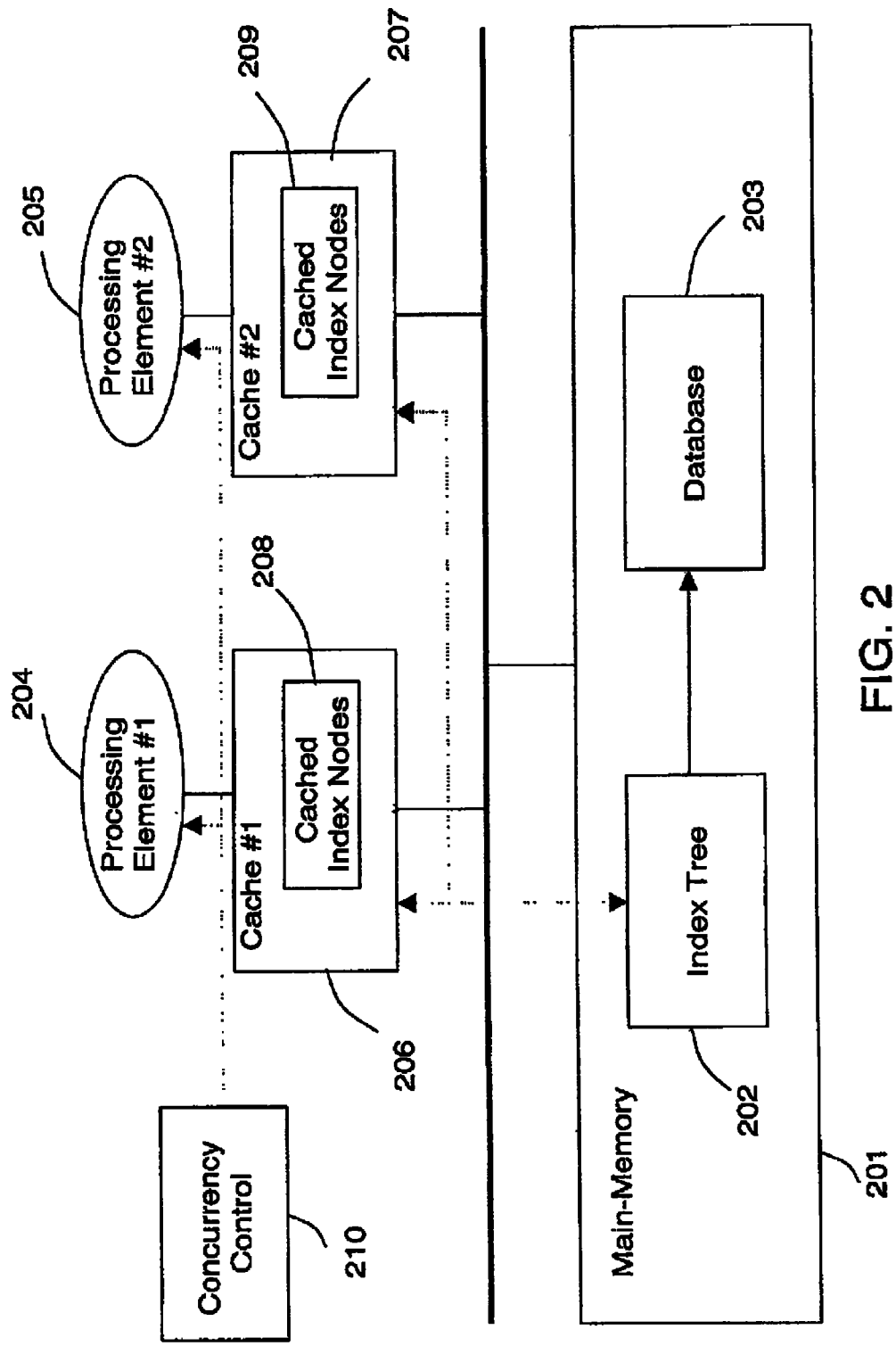
FIG. 2 is a block diagram of a concurrency control scheme of the present invention using optimistic latch-free index traversal (OLFIT) where a database and an index structure reside in main memory.

FIG. 2 illustrates an overall system implementing the optimistic latch-free index traversal (OLFIT) scheme in accordance with the present invention, which takes advantage of the "optimistic" characteristic of database transactions in the sense that the majority of database transactions do not conflict.

Main memory 201 stores a database 203 and an index structure 202, usually a tree, for efficiently managing the database. Cache #1 206 (or cache #2 207) is provided for processing element #1 204 (or processing element #2 205) to store frequently accessed index nodes 208 (or 209) so as to improve the overall memory access time performance. A concurrently control unit 210, preferably implemented in software, is provided to coordinate processing elements or threads so as to maintain the consistency of processing without too frequent invalidation of cache entries. Specifically, the concurrency control unit 210 provides control necessary for latch-free traversal of index nodes based on optimistic index concurrency control.

Figure 3:
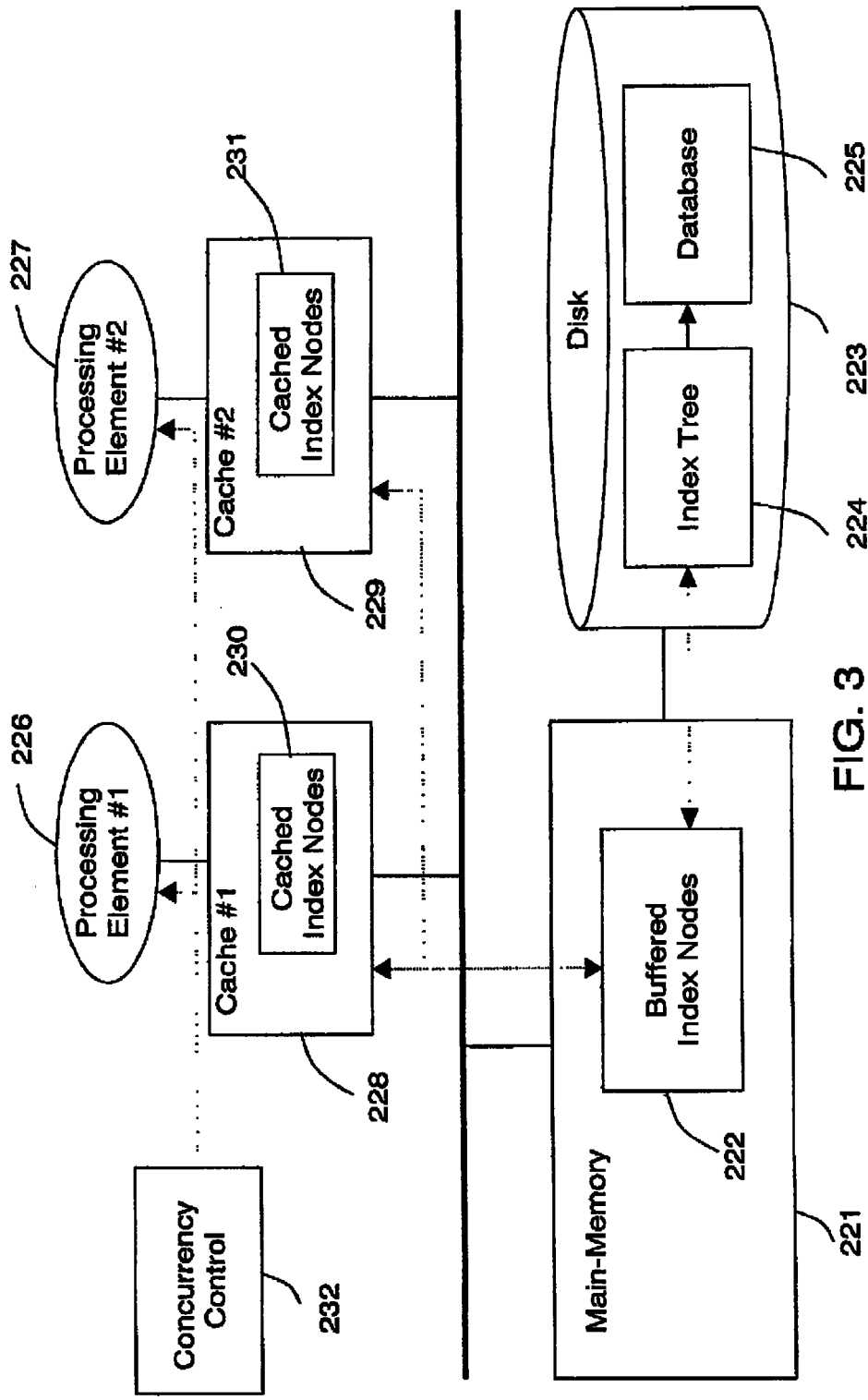
FIG. 3 is a block diagram of an alternative embodiment of the present invention where the database and the index structure reside in a disk instead of in main memory.

FIG. 3 shows an alternative embodiment of the present invention where the database 225 and the index tree 224 reside in a disk 223 instead of in main memory 201 as in FIG. 1. Main memory 221 stores subset of index nodes ("buffered index nodes") 222. Cache 190 1 228 is provided for processing element 190 1 226 to store frequently accessed index nodes ("cache index nodes") 230. Similarly, cache #2 229 is provided for processing element #2 227 to store cache index nodes 231. A concurrency control unit 232, preferably implemented in software, controls cache #1 228 and cache #2 229 in a multiprocessing environment.

Figure 4:
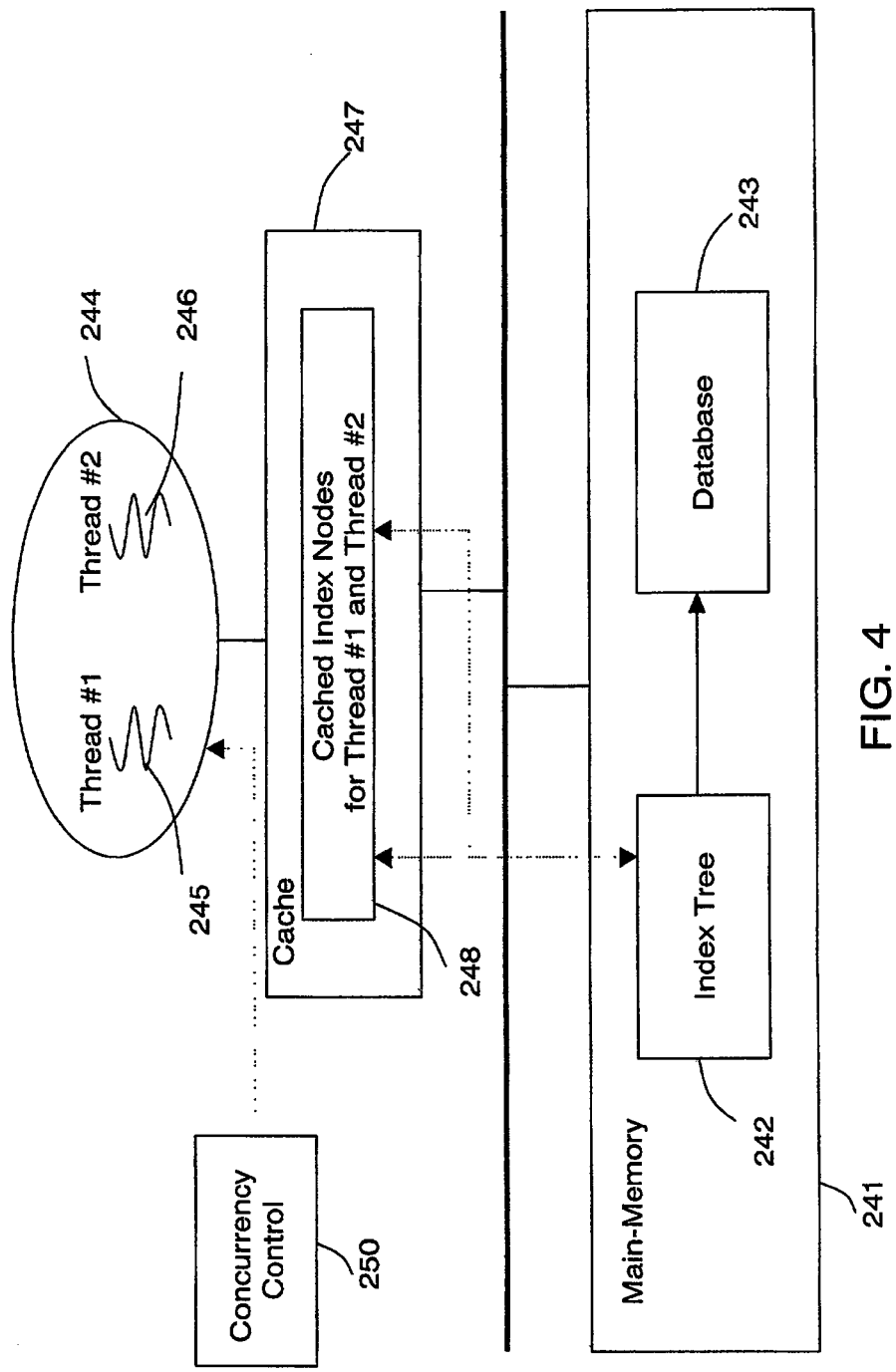
FIG. 4 is a block diagram of another alternative embodiment of the present invention where multiple threads independently access the index structure.

FIG. 4 shows another alternative embodiment of the present invention where multiprocessing is done through several processing threads capable of performing independent access to the database. A thread is a single sequential flow of control within a program. Running inside a processor 244 is thread #1 245 and thread #2 246 independently running to access a database 243 inside main memory 241, which also stores an index tree 242 referencing to the database entries. A cache 248 is provided, which has cache entries specific to each thread index nodes for thread #1 and thread #2 for storing frequently accessed indexes.

Node Operations for OLFIT

Figure 5:
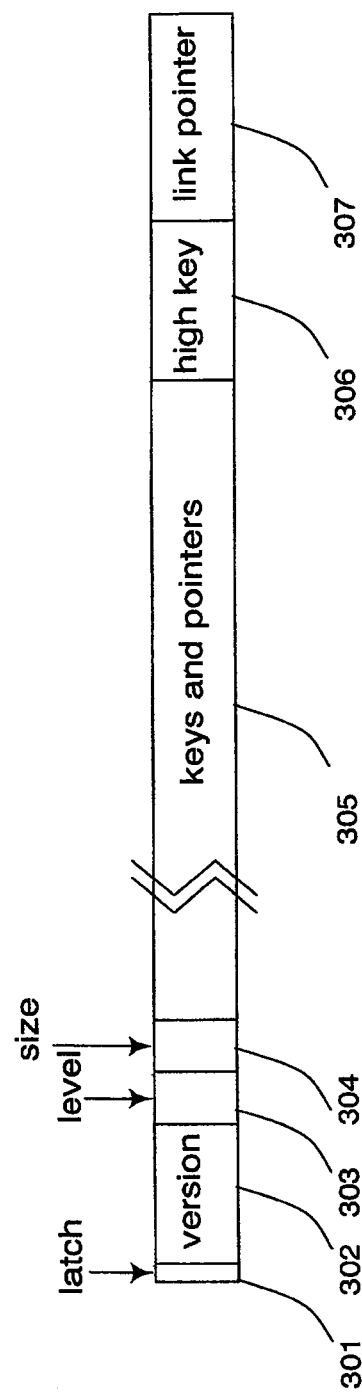
FIG. 5 is a structure of a B+-tree index node according to the present invention.

FIG. 5 shows the structure of a B+-tree index node used by the OLFIT scheme of the present invention. Stored in each index node are node content information and concurrency control information. The node contents include keys and pointers to other nodes 305 for accessing the database. The concurrency control information includes a latch 301 for governing concurrent access to a node and a version number 302 for indicating the updated status of the node contents. The node contents further include a level 303 specifying the level number of the node in the tree index, a size 304 for specifying the number the number of entries in the node, a high key 306 and a link pointer 307. The usage of the high key 306 and the link pointer 307 will be explained below.

The OLFIT scheme is based on atomic reads and atomic writes of words, each of which operation is treated as a single indivisible unit of work. Atomic reads and atomic writes of a word are supported on current generation architectures. In the description for primitives for reading and updating nodes, it is assumed that the following operations can be done atomically: reading the version number, updating the version number, updating the latch, and checking whether the latch has already been held.

Update Node Primitive

U1. Acquire a latch in the exclusive mode.

U2. Update the contents of the node.

U3. Increment the version number.

U4. Release the latch.

The Update Node primitive is "consistent," which guarantees that the update changes a node from a consistent state into another consistent state. To do that, update operations on a node are isolated and serialized using the 1-bit latch on the node. A latch in the exclusive mode insures that no other transaction accesses the node when the update occurs. An updater acquires a latch on a node for exclusive access when there is no exclusive lock held on that node before updating the contents of the node such as the level, size, keys & pointer, high key, and link pointer. The latch is released after the update. Updaters also increment the version number before releasing the latch. Differently from node reads, node updates always succeed and there is no need for retry. Step U3 of incrementing the version number is intended to enable the readers to read the node without latch and verify whether the nodes they read are in a consistent state or not.

Read Node Primitive:

R1. Copy the version number into a register X.

R2. Read the contents of the node.

R3. If a latch is locked on the node, go to R1 (after an optional delay).

R4. If the current version number is different from the copied value in X, go to R1 (after an optional delay).

The Read Node primitive is "consistent" in the sense that steps R3 and R4 guarantee the readers only reading a node in a consistent state without holding any latches. Readers can pass both R3 and R4 only if the data read in R2 is in a consistent state, otherwise readers start again from R1. Before starting again from R1, the Read Node primitive may optionally wait for some time until the conflict with concurrent Update Node primitive to be resolved. The consistency of information read by Read Node primitive is stated as a theorem and proved as follows.

Theorem: Coupled with the Update Node primitive, the Read Node primitive guarantees that the contents of a node read in R2 cannot be in an inconsistent state. In other words, if the contents of a node read in R2 are in an inconsistent state, the condition in R3 or the condition in R4 becomes true and the reader cannot pass both R3 and R4.

Proof: R3 checks if there is any concurrent update. If the condition in R3 is false and the reader can pass R3, either U4 of any concurrent update must have been finished before R3 or U1 of it must start after R3, because U1 holds the latch and U4 releases the latch. R4 checks if there are any updates of the version number between R1 and R4. If the condition in R4 is false and the reader can pass R4, U3 of any concurrent update must be either before R1 or after R4, because U3 updates the version number. In the following formulae, A.fwdarw.OB means A is executed before B. Two statements R1.fwdarw.R2.fwdarw.R3.fwdarw.R4 and U1.fwdarw.U2.fwdarw.U3.fwdarw.U4 hold by the definition of the ReadNode and UpdateNode primitives. The case where both R3 and R4 are passed (when both conditions in R3 and R4 becoming false) can be expressed and induced as follows: 1 ((U4 R3)(R3 U1))((U3 R1)(R4 U3))=((U4 R3)(U3 R1))((R3 U1)(U3 R1))((U4 R3)(R4 U3)((R3 U1)(R4 U3))=((U4 R3)(U3 R1)) FALSE FALSE ((R3 U1)(R4 U3)) (U3 R1)(R3 U1)

Therefore, if both conditions in R3 and R4 are false, either U3 of any concurrent updates must be before R1 or U1 of it must be after R3. Since the update of the node contents in U2 is between U1 and U3, and the read of the node contents in R2 is between R1 and R3, the contents of a node read in R2 cannot be in an inconsistent state. Q.E.D.

Note that R3, the step of checking the latch, and R4, the step of checking the current version number may be executed in a single instruction.

For the robustness, the ReadNode primitive can be adjusted to limit the number of retrials. ReadNode with a limited number of retrials is described as RobustReadNode. The RobustReadNode primitive uses a primitive, ConversativeReadNode, which acquires a shared-mode latch before reading the node when the number of retrial exceeds a certain limit. A shared-mode latch allows several read transactions concurrently and it produces no conflict as long as the concurrent transactions are read-only. In RobustReadNode, RETRY_LIMIT is a user-defined upper bound of the number of retrials and the retrial number is a local variable counting the number of retrials. For simplicity, R3 and R4 of ReadNode are concatenated by 'or' in RobustReadNode.

ConservativeReadNode Primitive:
PR1. Acquired a latch in the shared mode.
PR2. Read the contents of the node.
PR3. Release the latch.
RobustReadNode Primitive:
RR1. Initialize the retrial number as 0.
RR2. Copy the version number into a register X.
RR3. Read the contents of the node.
RR4. If the latch is locked in the exclusive mode or the current version number is different from the copied version number in X,
RR4-A. If the retrials is less than or equal to the RETRY_LIMIT, increment the retrials and go to RR2.
RR4-B. Otherwise, execute ConservativeReadNode.

Compared to ReadNode for the dominant case without conflict, RobustReadNode uses just one more instruction in the RR1.

The following shows an implementation of the Read Node and Update Node primitives. The implementation of ReadNode instead of RobustReadNode is shown for the reason of simplicity. Thus, those in the relevant art will appreciate that the implementation of ReadNode can be easily modified to that of RobustReadNode.

Implementation of the Read Node and Update Node primitives can be directly derived from the description of the operation if the latch was implemented using one of the atomic read-and-write operations such as test-and-set and compare-and-swap that are supported universally on the current generation of computer architectures.

However, since consuming two words for the latch and the version number per every node is expensive given the node size in that order of one or two cache blocks, these two words are combined into a single word named ccinfo. The least significant bit ("LSB") of ccinfo is used for the latch and other bits in the word are used for the version number. This combination enables further optimization of using only one conditional jump for checking the conditions of R3 and R4 in Read Node primitive.

The operation compare-and-swap (A, B, C) is an atomic operation that compares the value of A and the value of B, and if they are equal, replaces A by the value of C. The operation returns the original value of A. Turn-on-LSB (word) and turn-off-LSB (word) are bit operations that turn on and off the LSB of a word, respectively.

The update_node procedure is an implementation of the UpdateNode primitive. Step 2 of the procedure latch copies the value of ccinfo with its LSB turned off. Step 3 of the procedure latch checks whether the LSB of ccinfo is turned on or not by comparing the value of ccinfo and the value of t copied in step 2, and atomically turns on the LSB of ccinfo by replacing the value of ccinfo by t with its LSB turned on. The procedure unlatch releases the latch and increments the version number by increasing ccinfo. Since the LSB of ccinfo is turned on in the procedure latch, the increment in the procedure unlatch turns off the latch and increments the version number simultaneously.

The read_node procedure is an implementation of the ReadNode primitive. Step 4 of read_node checks conditions in R3 and R4 of ReadNode simultaneously, because if t is equal to ccinfo, the LSB of the current ccinfo must be turned off and other bits must have not been changed since step 2.

Tree Operations for OLFIT

OLFIT guarantees tree traversals to reach the correct leaf nodes according to the search keys without latching in the presence of concurrent splits and deletions of nodes. The latch-free traversal reduces coherence cache misses and enhances performance of tree operations including search, insert, and delete because those operations contain tree traversals. For instance, the search operation begins with traversal to the left most leaf node containing the search key and then traverses leaf nodes rightward. The insert operation begins with traversal to the leaf node that will contain a new entry and then inserts the entry to the node. The delete operation begins with traversal to the leaf node that contains the entry to delete and then removes the entry from the node.

Dealing with Node Split

Since the OLFIT scheme does not use lock coupling while traversing down a tree index, concurrent updaters may split the target child node of the traversal before the traversal reaches the child node. Moreover, since no latch is held while reading a node, concurrent updaters may also split the node currently being read.

Figures 6A, 6B:
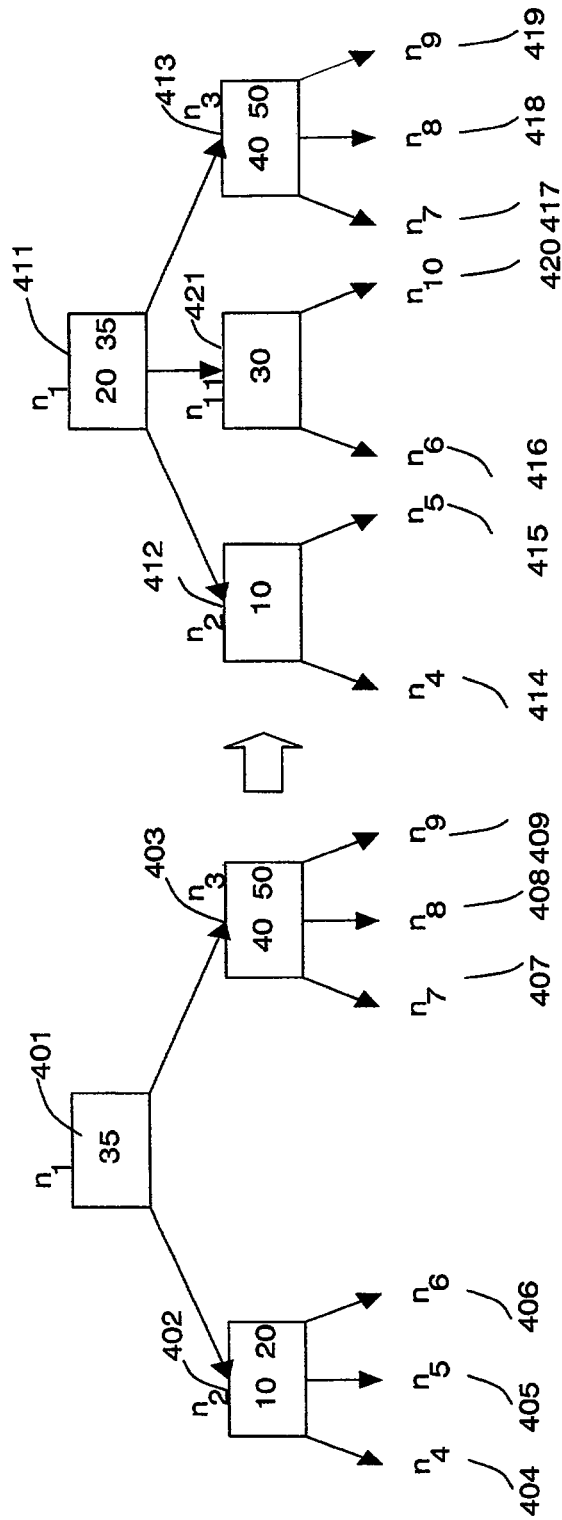
FIG. 6 is an illustration of node split operation without a high key and a link pointer during node splitting.

FIGS. 6A and 6B show an example of node split before and after the node split, respectively, using the conventional index structure. The figures show the situation where a reader is traversing down through $n_2$ 402 with a search key of 25, and a concurrent updater that inserts n10 may split $n_2$ 402 in FIG. 6A into ($n_2$ 412 and $n_{11}$ 421) in FIG. 6B by propagation of the split of $n_6$ 406 into ($n_6$ 416 and $n_{10}$ 420). If the traversal passes $n_2$ after the split, it will be routed to $n_5$ 415 instead of $n_6$ 416 and it will reach a wrong leaf node in the end.

Figures 7A, 7B:
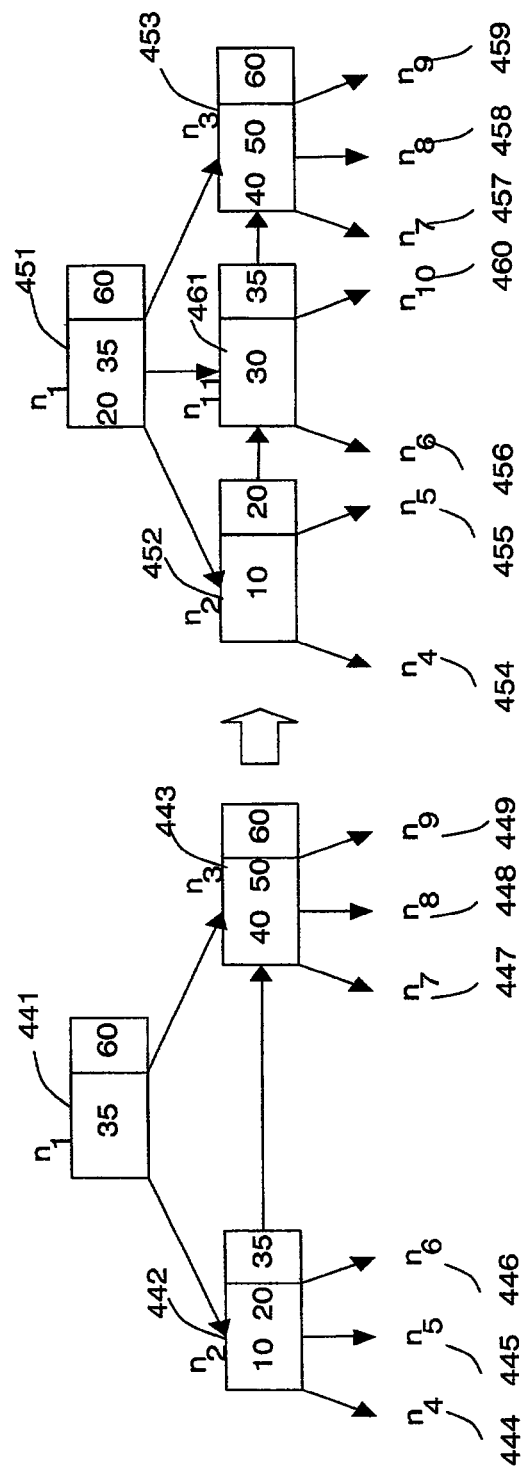
FIG. 7 is an illustration of node split operation with addition of a high key and a link pointer to guarantee a correct index traversal during node splitting.

FIGS. 7A and 7B show an example of node split before and after the node split, respectively, using the index structure of the present invention which adds a high key indicating an upper bound of key values in the node and a link pointer pointing to a right sibling of the node at the same level to deal with the above-mentioned node split problem. All splits are done from the left to the right and to each node, a high key and a link pointer are added. The high key of a node denotes the upper bound of the key values in the node, and the link pointer is a pointer pointing to the right sibling of the node at the same level. The link pointer provides an additional path for reaching a node, and the high key determines whether to follow the link pointer or not. With the link pointer, since splits are done from the left to the right and each node has its high key and its link pointer to the right sibling, all nodes split from a node are reachable from the node and the correct child node can be reached in the presence of concurrent splits of nodes.

FIG. 7B shows that even if a concurrent updater splits $n_2$ 442 of FIG. 7A into ($n_2$ and $n_{11}$) of FIG. 7B, the traversal with a search key of 25 passing through $n_2$ 452 after the split will be routed to $n_{11}$ 461 by the link pointer and then be routed correctly to $n_6$, 456.

Tree Traversal Procedure

The following illustrates a tree traversal procedure that finds a leaf node correspondent to a search key.

In the traversal procedure, find_next_node (node, search_key) is an operation that finds next node to traverse. If search key is greater than the high key of the node this operation returns link pointer and otherwise, returns the pointer to the appropriate child nodes to traverse down.

The read_node procedure is embedded in the traverse procedure. The value of next_node is assigned to the variable node only when the value of next_node is computed from a node in a consistent state.

Dealing with Node Deletion

As concurrent updaters can split nodes being read, the updaters also can delete nodes being read if the nodes are empty. To deal with this case, when a node becomes empty, the updater only removes links directed to the node and registers the node into a garbage collector. The link pointer in the empty node is not removed until the node is actually deallocated. The garbage collector actually deallocates the registered node when there are no index operations that can read the node. To decide whether there is any index operation that can read the node or not, the same garbage collection with physical versioning is used, but the overhead is quite different, because physical versioning uses the garbage collector at every update but it is used only when an updater removes an empty node from a tree index.

A global timestamp and private timestamps attached to each thread is used. Note that it is assumed that threads execute transactions. The global timestamp is initialized as 0 and the private timestamps are initialized as .infin. Each thread copies the value of the global timestamp into its private timestamp without latching when it starts an index operation and resets its private timestamp to .infin. when it ends the index operation. After a thread deletes a node, it registers the node in the garbage collector with the current value of the global timestamp and increments the global timestamp holding the latch associated with the global timestamp. The garbage collector periodically scans all private timestamps of threads and actually deallocates nodes that are registered with a timestamp that are smaller than the current minimum of private timestamps. Since deleted nodes are registered with the value of the global timestamp after the deleted nodes are unreachable and private timestamps are set to the value of the global timestamp before starting traversal, nodes registered with a timestamp smaller than the current minimum of private timestamps can not be reached by any index operation.

Although it was stated that Read Node and Update Node primitives are used to guarantee the consistency between node accesses, a variant that uses the primitives to guarantee the consistency between index accesses is possible. The following are examples of such variants, specifically, Update Index Primitive and Read Index Primitive.

Update Index Primitive

U1. Acquire a latch in the exclusive mode.

U2. Update the index.

U3. Increment the version number.

U4. Release the latch.

Read Index Primitive:

R1. Copy the version number into a register X.

R2. Read the index.

R3. If the latch is locked, go to R1 (after optional delay).

R4. If the current version number is different from the copied version number stored in X, go to R1 (after optional delay).

Transaction-Duration Locking

The present invention may be combined with transaction-duration locking on records to support the serializability of transactions. One example of such combination is described with Find_First, Find_GE, Find_GT, Scan_Next, Insert, and Delete primitives. It is assumed that items indexed in an index are sorted by ascending order from the left to the right. Find_First is an operation that finds the left-most item in the index and initializes an iterator. Find_GE is an operation that finds the left-most item whose key value is greater than or equal to the value of a search key in the index and initializes an iterator. Find_GT is similar to Find_GE except that Find_finds item whose key value is greater than the value of a search key. Scan_next is an operation that finds the next item of the item found by Find_First, Find_GE, Find_GT, or Scan_Next. Insert is an operation that adds an item into an index, whereas Delete is an operation that removes an item from an index.

The following illustrates the Find_GE procedure.

In the Find_GE procedure, Find_position_GE (node, search_key) is an operation that returns the position of the left-most record whose key is greater than or equal to the search_key in the node. This operation returns a value greater than the size of the node. Get_record (node, position) is an operation that returns the pointer to a record at the position in the node. Lock (record, mode) is an operation that holds a transaction-duration lock on the record with the specified mode, and unlock (record) is an operation that releases the transaction-duration lock on the record.

The read_node procedure is embedded in the Find_GE procedure for traversing to the right and for locking records.

Although the example is directed to Find_GE, it will be apparent to those skilled in the art that other primitives, Find_First, Find_GT, Scan_next, Insert and Delete, may be implemented in the same way.

II. Adaptation for CSB+-TREE

FIGS. 8A and 8B show nodes and node groups adapted for the CSB+-tree for OLFIT. FIG. 8A shows the node structures for non-leaf nodes 500. For the CSB+-tree, the nodes with the same parent are clustered in a contiguous space called node group 508 consisting of non-leaf nodes 500 of the CSB+-tree storing only the pointer to the child node group instead of storing all pointers to child nodes. For this reason, the right sibling of a node can be found without a pointer to the sibling, if the parent of the right sibling is the same with the parent of the node. Each CSB+-tree node for OLFIT only store a high key 507 without any link pointers because the right sibling in the same node group can be located without a pointer. Only one link pointer to the right node group is stored for each node group to locate the right siblings in other node groups as shown in FIG. 8A. The link pointer 512 has its own latch 510 and version number 511, because the link pointer 512 does not belong to any node in the node group.

Similarly, FIG. 8B shows the node structure for leaf nodes. Here, the CSB+-tree means the full CSB+-tree, one of the variations of the CSB+-tree. Extensions to other variations of the CSB+-tree should be apparent to those skilled in the art.

The split operation of the CSB+-tree is different from that of the B+-tree. Since nodes with the same parent are clustered into a node group, when a node split, all right siblings in the node group shift right to make a room for the split if the node group is not full. If the node group is full, the node group splits into two node groups. When a node splits without the node group split, the node to split, all right siblings to shift, and the parent node are latched before the split. When the node group splits by a split of a node in the group, the node to split, the nodes to be moved into the new node group, the link pointer to the right node group and the parent node are latched before the split.

III. Experimental Results

The present invention was implemented to verify its superior scalability. The performance under the OLFIT scheme was compared with that of four other index concurrency control schemes for the B+-tree and the full CSB+-tree: (1) lock coupling with node latches ("LC"), (2) tree-level locking with a tree latch ("TL"), (3) physical versioning with node latches ("VN"), and (4) physical versioning with a tree latch ("VT"). The performance of index operations without any concurrency control ("NO") was also measured for the 100% search and the single thread experiment. For the physical versioning schemes, VN and VT, the versioning scheme used for the T-tree was adapted for the B+-tree and for the full CSB+-tree.

The experiment was run on a Sun Enterprise 5500 server with 8 CPUs (UltraSparc II, 400 MHz) running Solaris 2.7. Each CPU had a 8 MB L2 cache with the cache line size of 64 bytes. Each concurrency control scheme was run with the following four conditions of workloads: (1) 100% search operations, (2) 100% insert operations, (3) a mix of 50% insert and 50% delete operations, and (4) a mix of search, insert and delete operations with varying update ratios.

For a fair comparison with the physical versioning schemes that require substantial memory allocation for updates, memory pools were used to reduce the overhead of system calls for memory allocation. The same number of memory pools were created as the number of processors in the system, and assigned one to each thread to minimize the contention for memory allocation.

For each experiment, non-unique indexes were used that allow duplicate key values, where the indexes were initialized by the insertion of 10 million uniformly distributed 4-bytes integer keys and associated pointers. The size of each pointer was 4 bytes because the experiments were run in the 32-bit addressing mode. After the initialization, the height of B+-trees was 7, and the height of full CSB+-trees was 6. The size of B+-trees was about 140 MB, and the size of full CSB+-trees was about 190 MB. B+-trees and full CSB+-trees were about 70% full because they were initialized by insertion operations. The size of 128 bytes was chosen for the size of index nodes because the 128-byte node produces the best performance when the indexes are built by insertions.

Figure 9B:
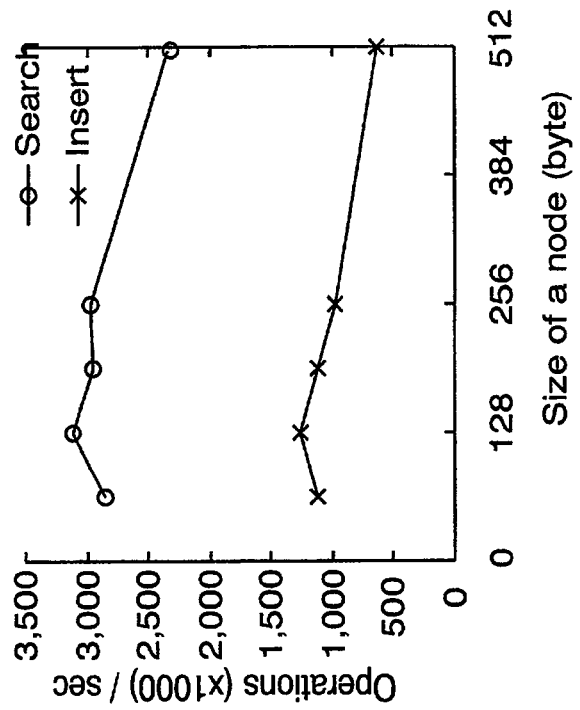
FIGS. 9A and 9B are graphs showing the eight-thread performance of OLFIT with a varying node size in a B+-tree and a full CSB+-tree, respectively.
Figure 9A:
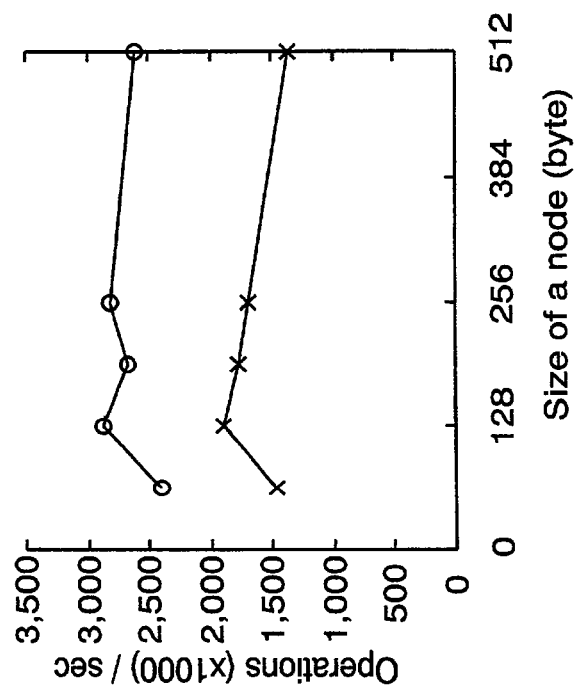

FIGS. 9A and 9B show the performance under the OLFIT scheme with varying node sizes. The graphs show that the 128-byte node size produces the best performance. The nodes of B+-trees and full CSB+-trees are about 70% full on average when the indexes are built by insertions. With 70%-full nodes, there is a high probability of accessing only the first 64-byte block of 128-byte nodes.

Table 1 shows the maximum number of fanouts for nodes when each concurrency control scheme is applied. TL and VT allow the largest fanout number because the schemes need no concurrency control information on the nodes. LC and VN allow the smaller fanout number because the schemes need a latch on each node. OL allows the smallest fanout number because the scheme needs a latch, a version number, a high key and a link pointer at each node.

---

1 TABLE 1 OL LC TL VN VT B+-tree Leaf 14 15 15 15 15 Non-Leaf 14 15 16 15 16
CSB+-tree Leaf 14 15 15 15 15 Non-Leaf 28 29 30 29 30

---

Purely Search Performance

Figure 10A:
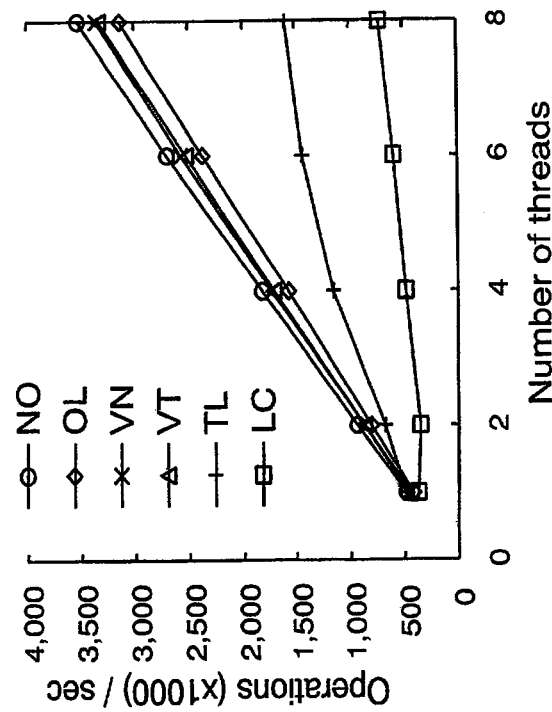
FIGS. 10A and 10B are graphs showing the search performance of various concurrency control schemes in a B+-tree and a full CSB+-tree, respectively.
Figure 10B:
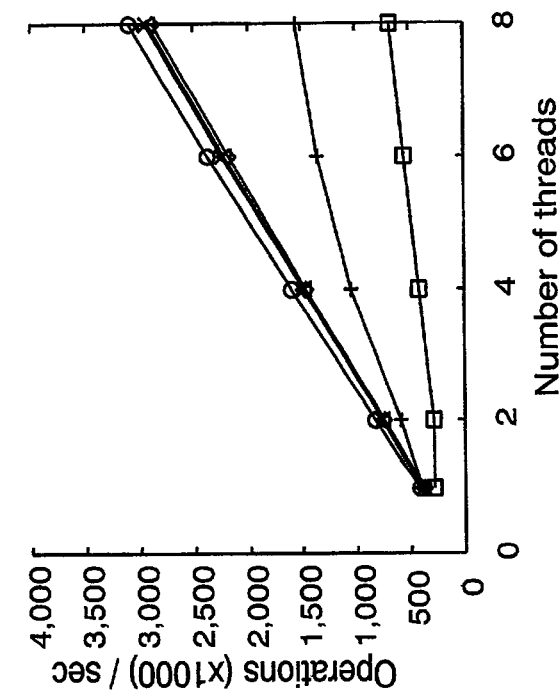

FIGS. 10A and 10B show the purely search performance under various concurrency control schemes applied to the B+-tree and the full CSB+-tree, respectively. The throughput of exact match search operations was measured by varying the number of threads that perform the search operations. The x-axis shows the number of threads performing search operations, while the y-axis shows the aggregated throughput.

The OLFIT (OL) scheme and the physical versioning schemes (VN, VT) show a performance similar to the case without any concurrency control (NO). The gap between the physical versioning schemes and no concurrency control is the cost of setting the private timestamp for the garbage collector. OL, VN, and VT copy the value of the global timestamp to the private timestamp when starting a traversal and reset the value of the private timestamp into infin. when finishing the traversal.

The gap between OL and NO using the CSB+-Tree in FIG. 10B is wider than the gap using the B+-tree in FIG. 10A because of the different cost involved in checking the high key. With the B+-tree, the high keys need not be specially treated on non-leaf nodes because traversing the right sibling and traversing down to one of the children are not different. With the CSB+-trees, however, traversing the right sibling and traversing downward are different. The positions of child nodes are computed from the pointer to the child node group while the position of the right sibling is computed from the position of the current node. This special treatment on high keys consumes slightly more time and makes the small gap from the physical versioning schemes.

The tree-level locking (TL) becomes worse as the number of threads increases due to the contention at the tree latch and two more coherence cache misses generated by holding the tree latch and releasing the tree latch. The performance of the lock coupling (LC) is worst. The gap from the no concurrency control widens almost linearly with the number of threads, because the lock coupling generates many coherence cache misses by latching many nodes.

Purely Update Performance

Figures 11A, 11B:
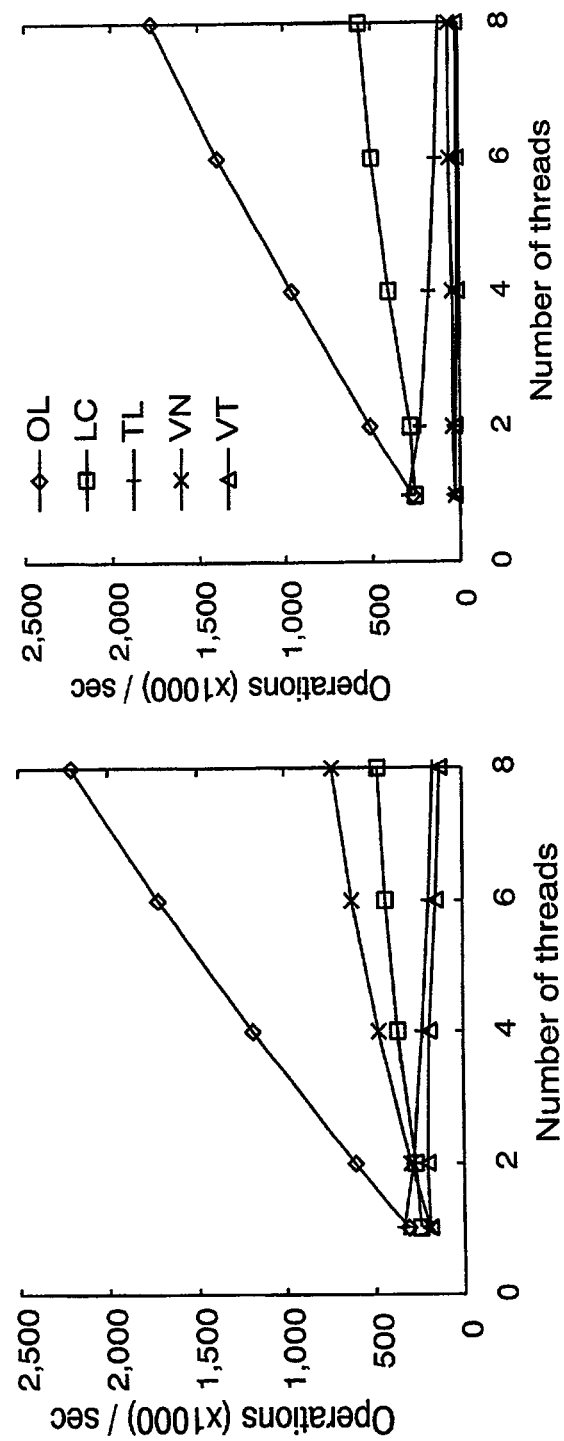
FIGS. 11A and 11B are graphs showing the insert and delete performance of various concurrency control schemes in a B+-tree and a full CSB+-tree, respectively.

FIGS. 11A and 11B show the purely update performance under various concurrency control schemes applied to the B+-tree and the full CSB+-tree, respectively. The throughput of update operations was measured by varying the number of threads that perform update operations. The x-axis shows the number of threads performing the update operations, while the y-axis shows the aggregated throughput. One half of the operations are insertions, and the other half are deletions.

FIGS. 11A and 11B show that only the OLFIT scheme (OL) shows a scalable performance. The physical versioning schemes (VT, VN) show a poor update performance due to the high cost of versioning, especially for the CSB+-tree where the whole node group must be versioned for each update. The performance result shows that VN is slightly better than VT in update performance because the scheme of VN that was originally proposed for the T-tree was changed in the process of adapting it to the B+-tree. If structure modifications take place, VN holds a tree latch. The need for the centralized tree latch from VN is eliminated because the split of the B+-tree is different from the rotation of the T-tree and the centralized tree latch is not needed for structure modifications. The centralized tree latch degenerates the update performance significantly as the number of threads increases.

Although the physical versioning with node latches (VN) and the lock coupling (LC) do not produce a good performance, their performance increases slowly as the number of threads increases. However, the physical versioning with a tree latch (VT) and the tree-level locking (TL) degrade the number of threads increases due to the contention at the centralized tree latch.

Performance with Various Update Ratio

Figure 12A:
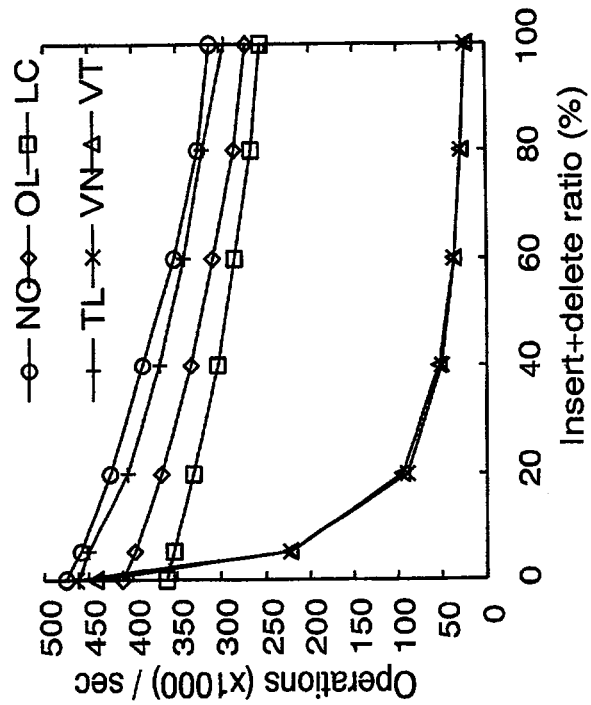
FIGS. 12A and 12B are graphs showing the single-thread performance of various concurrency control schemes with a varying update ratio in a B+-tree and a full CSB+-tree, respectively.
Figure 12B:
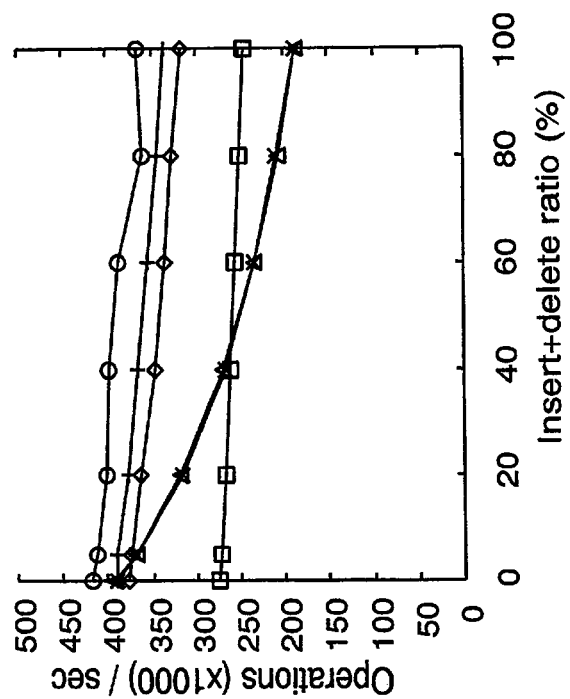

FIGS. 12A and 12B show the performance result using a single thread under various concurrency control schemes with various update ratios. The x-axis shows the ratio of update operations, while the y-axis shows the aggregated throughput.

The OLFIT (OL) and the tree-level locking (TL) schemes show a performance similar to the case where no concurrency control (NO) is used. The lock coupling (LC) shows a worse performance than those of OL and TL due to the overhead of latching. Two physical versioning schemes (VN, VT) show a good performance when the update ratio is near zero, but as the update ratio grows, their throughputs drop sharply due to the high overhead of physical versioning. As shown in FIG. 10B, the versioning overhead is even heavier for the CSB+-tree where the nodes having the same parent are grouped in a contiguous space so that versions are created on a node group basis.

Figures 13A, 13B:
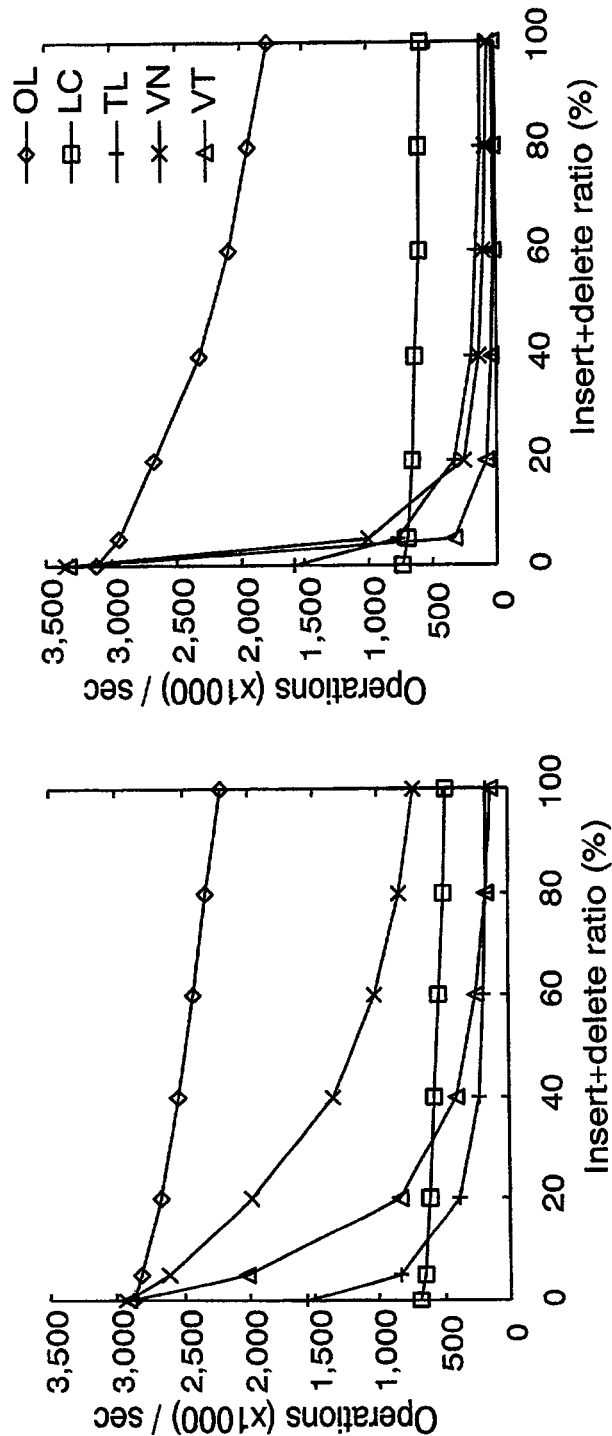
FIGS. 13A and 13B are graphs showing the eight-thread performance of various concurrency control schemes with a varying update ratio in a B+-tree and a full CSB+-tree, respectively.

FIGS. 13A and 13B show the performance result using eight threads in a multiprocessing environment. When the update ratio is near zero, the performance of the physical versioning schemes (VN, VT) is comparable to that of the OLFIT scheme (OL). However, as the update ratio grows, OL becomes significantly better than the other concurrency control schemes.

The performance gap between OL and the other schemes becomes wider with eight threads than with a single thread. The gap widens partly due to the large amount of coherence cache misses generated by the other schemes and partly due to the contention created at the centralized tree latch in the case of TL and VT. Note that the performance of VT is slightly better than that of TL, but the performance approaches to that of TL as the update ratio further increases, and eventually crosses the performance of TL due to the high cost of versioning.

The performance drops more sharply for the CSB+-tree than for the B+-tree as the update ratio increases because of the higher split cost of the CSB+-tree. In the CSB+-tree, when a node split, if the node group that contains the node is not full, all the right siblings of the node in the same node group are shifted right, and if the node group is full, half of nodes in the group are moved into a new node group. Note that VN and VT are even worse than TL as the update ratio exceeds 20% due to the high cost of versioning.

In summary, OLFIT shows almost linear update scalability on the eight-CPU multiprocessor system while showing the read scalability comparable to those of the no concurrency control and the state-of-art main-memory index concurrency control that also provides the latch-free-traversal through the physical versioning of index nodes.

The present invention can be applied to other B+-tree variants such as the B-tree, the B-tree, and the pkB-tree. Although the preferred embodiments were shown for B+-tree variants, those skilled in the art would appreciate that the OLFIT scheme of the present invention can readily be adapted for other index structures such the T-tree, a balanced binary tree with many elements in a node, the R-tree for multidimensional indexes, CR-tree, a cache-conscious version of the R-tree, and GiST (Generalized Search Tree), an extensible data structure which allows users to develop indices over any kind of data and allows users to customize it to behave as their own index structure.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

Elements of the present invention may also be provided as a machine-readable storage medium for storing machine-executable instructions. The machine-readable storage medium may include, but is not limited to, hard disk drives, flash memory, optical disks, CD-ROMs, DVD ROMs, RAMs, EPROMs, EEPROMs, magnetic or optical cards or other type of machine-readable storage media suitable for storing electronic instructions.

What is claimed is:

1. A device for searching a database, the device comprising:
   a memory configured to store an index tree that has one or more nodes including a root node, each node associated with a latch governing concurrent access to the node and each node having contents including one or more keys including a high key, the high key denoting the upper bound of the one or more keys, a version number indicating a sequence of updates of the node contents, a link pointer pointing to a right sibling of the node at the same level, and one or more pointers pointing to data items in the database in the case of a leaf node and to child nodes in the case of a non-leaf node; and a concurrency controller operatively coupled to the memory, the concurrency controller configured to:

lock the latch of a first node of the one or more nodes that is traversed;

update, within the memory, the contents of the first node after the latch of the first node is locked, the updating of the contents including updating at least one of the one or more keys, the link pointer, or the one or more pointers;

increment the version number included in the first node based on the updating of the at least one of the one or more keys, the link pointer, or the one or more pointers within the memory; and release the latch of the first node after the version number is incremented.

2. The device of claim 1, wherein the concurrency controller is configured to:

copy the version number of a second node of the one or more nodes that is traversed into a register:

read the contents of the second node;

check the latch of the second node;

based on the latch of the second node being locked on the second node, return to the copying of the version number of the second node for retrial;

check a current version number of the second node; and based on the current version number of the second node being different from the version number of the second node copied in the register, return to the copying of the version number of the second node for retrial.

3. The device of claim 2, wherein the concurrency controller is configured to check the latch of the second node and the current version number of the second node in a single step.

4. The device of claim 1, wherein the concurrency controller is configured to add a new node to an old node by performing a split operation, wherein the spilt operation comprises:

creating the new node;

moving from the old node to the created new node one or more of the keys of the old node, one or more of the pointers of the old node, the link pointer of the old node pointing to the right sibling;

calculating the high key for the new node;

calculating the new high key for the old node; and changing the link pointer of the old node such that the link pointer of the old node points to the new node.

5. The device of claim 1, wherein the concurrency controller is configured to delete an empty node by deleting a leaf node when the contents of the leaf node no longer have any pointer to data item in the database and to delete a non-leaf node when the contents of the non-leaf node no longer have any pointer to a child node.

6. The device of claim 5, wherein the concurrency controller is configured to remove the link pointer in the empty node when the empty node is actually deallocated.

7. The device of claim 1, wherein the database is configured to reside in main memory.

8. The device of claim 1, wherein the database is configured to reside in disk.

9. The device of claim 1, further comprising one or more processors, wherein each processor of the one or more processors is configured to independently access the index tree.

10. The device of claim 1, further comprising one or more processors, wherein each processor of the one or more processors is configured to run one or more threads, wherein each thread of the one or more threads in the each processor is configured to independently access the index tree.

11. The device of claim 1, wherein the index tree is selected from a set of index trees including a B+-tree, a CSB+-tree, a B-tree, a B*-tree, a T-tree, an R-tree, a CR-tree and a GIST.

12. The device of claim 1, wherein the concurrency controller is further configured to serialize transactions accessing the database as a function of transaction-duration locking on a record associated with a respective node.

13. The device of claim 1, further comprising a cache, wherein the cache is configured to store frequently accessed nodes of the index tree.

14. The device of claim 1, wherein the memory is configured to store only a subset of the one or more nodes of the index free.

15. The device of claim 1, wherein the version number of the first node comprises two or more bits.

16. The device of claim 1, wherein the latch and the version number of the first node comprises a single word.

17. The device of claim 16, wherein the least significant bit (LSB) of the single word is configured to be used for the latch and wherein the other bits of the single word are configured to be used for the version number.

18. The device of claim 17, wherein the concurrency controller is configured to execute a turn-off-LSB function that returns the value of the single word with the LSB of the single word turned off as a value.

19. The device of claim 17, wherein the concurrency controller is configured to:

execute a turn-off-LSB function that returns the value of the single word with the LSB of the single word turned off as a first value;

execute a turn-on-LSB function that returns the value of the single word with the LSB of the single word turned on as a second value; and execute a compare-and-swap function, the compare-and-swap function configured to compare the first value with the current value of the single word, to replace the single word with the second value if the first value and the second value are the same and to go back to the step of executing the turn-off-LSB function for retrial if the first value and the second value are not the same.

20. The device of claim 2, wherein the concurrency controller is configured to insert a delay before going back to the step of copying the version number of the second node when the latch of the second node has been locked on the second node, or when the current version number of the second node is different from the version number of the second node copied in the register.

21. The device of claim 2, wherein the concurrency controller is further configured to limit a number of retrials to a specified number.

22. The device of claim 21, wherein the concurrency controller is further configured to acquire a shared latch before reading a third node when the number of retrials exceeds the specified number.

23. The device of claim 1, wherein the concurrency controller is configured to perform the updating the contents of the first node without rearranging the pointers of the first node.

24. The device of claim 2, wherein the reading of the contents of the second node is performed after the copying of the version number of the second node and before the checking of the latch of the second node.

25. The device of claim 2, wherein the first node and the second node comprise a same node.

26. The device of claim 1, wherein the concurrency controller is configured to:
perform the incrementing of the version number only after updating at least one key of the one or more keys for the first node.

27. A system for searching data, the system comprising:
a database storing data items; and
a device operatively coupled to the database, the device including;
a memory configured to store an index tree that has one or more nodes including a root node, each node associated with a latch governing concurrent access to the node and each node having contents including one or more keys including a high key, the high key denoting the upper bound of the one or more keys, a version number indicating a sequence of updates of the node contents, a link pointer pointing to a right sibling of the node at the same level, and one or more pointers pointing to data items in the database in the case of a leaf node and to child nodes in the case of a non-leaf node; and
a concurrency controller operatively coupled to the memory, the concurrency controller configured to:
lock the latch of a first node of the one or more nodes that is traversed:
update, within the memory, the contents of the first node after the latch of the first node is looked, the updating of the contents including updating at least one of the one or more keys, the link pointer, or the one or more pointers;
increment the version number included in the first node based on the updating of the at least one of the one or more keys, the link pointer, or the one or more pointers within the memory; and
release the latch of the first node after the version number is incremented;
a data item in the database is to be accessed when a leaf node corresponding to a search key associated with the data item is found.

28. The system of claim 27, wherein the database is configured to reside in main memory.

29. The system of claim 27, wherein the database is configured to reside in disk.

30. The system of claim 27, wherein the database is configured to store the index tree and wherein the memory is configured to store only a subset of the one or more nodes of the index tree.

31. The system of claim 28, further comprising a cache, wherein the cache is configured to store frequently accessed nodes of the index tree.

32. A non-transitory computer-readable storage medium storing instructions that, when executed by a computer, the computer having a storage device to store an index tree that has one or more nodes including a root node, each node associated with a latch governing concurrent access to the node and each node having contents including one or more keys including a high key, the high key denoting the upper bound of the one or more keys, a version number indicating a sequence of updates of the node contents, a link pointer pointing to a right sibling of the node at the same level, and one or more pointers pointing to data items in a database in the case of a leaf node and to child nodes in the case of a non-leaf node, cause the computer to perform operations comprising:
locking the latch of a first node of the one or more nodes that is traversed;
updating, within the storage device, the contents of the first node after the latch of the first node is locked, the updating of the contents including updating at least one of the one or more keys, the link pointer, or the one or more pointers:
incrementing the version number included in the first node based on the updating of the at least one of the one or more keys, the link pointer, or the one or more pointers within the storage device; and
releasing the latch of the first node after the version number is incremented.

33. A computer-implemented method of traversing an index tree stored in a storage device, the index tree having one or more nodes including a root node, each node associated with a latch governing concurrent access to the node and each node having contents including one or more keys including a high key, the high key denoting the upper bound of the one or more keys, a version number indicating a sequence of updates of the node contents, a link pointer pointing to a right sibling of the node at the same level, and one or more pointers pointing to data items in the database in the case of a leaf node and to child nodes in the case of a non-leaf node, the method comprising:
locking the latch of a first node of the one or more nodes that is traversed;
updating, within the storage device, the contents of the first node after the latch of the first node is locked, the updating of the contents including updating at least one of the one or more keys, the link pointer, or the one or more pointers;
incrementing the version number included in the first node based on the updating of the at least one of the one or more keys, the link pointer, or the one or more pointers within the storage device; and
releasing the latch of the first node after the version number is incremented.

* * * * *